No. 779,053. Patented January 3, 1905.

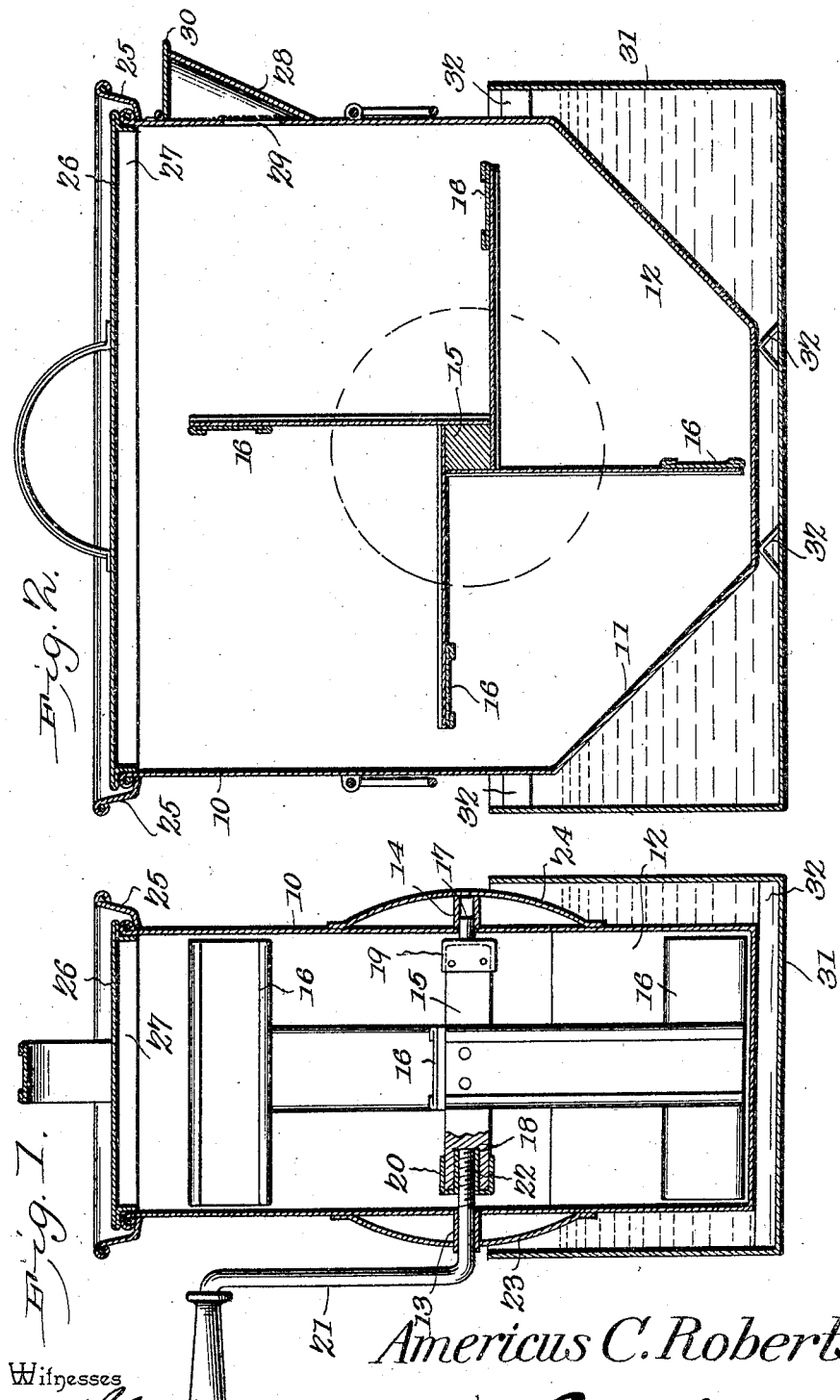

UNITED STATES PATENT OFFICE.

AMERICUS C. ROBERTS, OF SEARCY, ARKANSAS.

CHURN.

SPECIFICATION forming part of Letters Patent No. 779,053, dated January 3, 1905.

Application filed January 7, 1904. Serial No. 188,083.

*To all whom it may concern:*

Be it known that I, AMERICUS C. ROBERTS, a citizen of the United States, residing at Searcy, in the county of White and State of Arkansas, have invented a new and useful Churn, of which the following is a specification.

This invention relates to churns, and has for its object to simplify and improve the construction and produce a device of this character whereby the action is more direct, the "temper" of the cream more easily regulated, and the parts easily separable for cleansing.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages, and the right is therefore reserved of making all the changes and modifications which fairly fall within the scope of the invention and the claim made therefor.

In the drawings thus employed, Figure 1 is a transverse sectional elevation. Fig. 2 is a sectional side elevation.

The improved churn comprises a receptacle 10 for the cream, preferably of sheet metal, such as galvanized iron or steel or other non-corrosive metal, and with parallel side and end walls and with the lower portion formed with angular ends 11 12.

Extending outwardly from the side walls of the receptacle intermediately of its height are tubular bearings 13 14, one bearing, 14, being closed at its outer end and the other bearing, 13, open at both ends.

The dasher member consists of a central shaft 15, having radiating paddles 16 and with a stud 17 upon one end for rotative engagement with the closed bearing 14 and with a threaded socket 18 at the other end. The shaft member 15 will preferably be of wood, with caps 19 20 upon its ends, with which the stud 17 and socket 18 are integrally formed. A handle member 21 is provided having its inner end 22 threaded and adapted to be inserted through the bearing 13 and engaging the threaded socket 18. It will be obvious by this arrangement of parts that the dasher is securely mounted and may be rotated from the exterior of the receptacle.

Attached by their edges to the exterior of the receptacle are convex plates 23 24, with the central outwardly-extending portions connected, respectively, to the outer ends of the bearings 13 14, and thus not only firmly supporting the bearings, but also reinforcing and greatly strengthening the side walls of the receptacle.

Attached to the receptacle 10 just below its rim is an L-shaped flange 25, forming a "gutter" to receive and retain any "splashings" from the interior of the receptacle, the cover 26 having a depending rim 27 extending within the receptacle. Thus no matter how violently the cream may be thrown against the cover none will escape.

Extending from the receptacle near the top is a discharge-spout 28, having a "strainer" or retarder 29 between it and the interior of the casing and provided with a hinged cover 30.

The spout provides for the discharge of the buttermilk after the churning is completed and also for the discharge of the wash-water after the washing process.

The receptacle 10 rests in a pan or tank 31 for the tempering liquid and is supported removably therein and spaced from its bottom and sides, as by spacer-chocks 32.

The tempering liquid will be water and may be of any required temperature as the cream may require.

As clearly indicated in Fig. 1 of the drawings, it will be noted that the convexed disks 23 and 24 in addition to bracing the outer ends of the tubular bearings 13 and 14 also operate as chocks or spacers for contact with the sides of the receptacle 31 to prevent lateral play of the churn-body during manipulation of the crank 21. The churn-body is supported above the bottom of the receptacle 31 by the spacer-bars 32 upon the bottom of the receptacle, so as to permit of the tempering liquid having access to the bottom of the churn while the chocks or spacer-bars 32 at the top of the receptacle prevent endwise play of the churn-body, and the disks 23 and 24 prevent lateral play thereof, the top of the receptacle being open at opposite sides of the disks 23 and 24 to permit of the introduction of a tempering liquid into the receptacle.

By this simple arrangement of parts it is obvious that a very simply-constructed and rapidly-acting churn is produced which may be readily separated for cleansing and ventilation and in which the butter may be thoroughly washed after the churning by drawing off the buttermilk and inserting a supply of wash-water and rotating the dasher in the same manner as in churning and then after the washing is completed and the butter and wash-water removed the interior of the churn may be thoroughly washed by inserting fresh water and rapidly rotating the dasher. Then the dasher may be removed when required by simply rotating the handle 21 backwardly to release it from the socket 18 and detaching the shaft 15 and its paddles.

Having thus described my invention, what I claim is—

In a churn, the combination of a receptacle open throughout its top for the reception of a tempering liquid and provided across its bottom and opposite ends with internal spacers, a churn-body located within the receptacle and supported upon the bottom spacers with its ends engaging the end spacers, there being interspaces between the sides of the churn-body and the receptacle to permit of the introduction of a tempering liquid, tubular bearings piercing opposite sides of the churn-body, bowed braces secured externally to opposite sides of the churn-body with their intermediate portions connected to the outer ends of the respective tubular bearings to brace the same and extended into the receptacle in close proximity to the side walls thereof to form spacers for the churn-body, and a rotary dasher having its shaft journaled in the tubular bearings.

In testimony that I claim the foregoing as my own I have hereto affixed my signature in the presence of two witnesses.

AMERICUS C. ROBERTS.

Witnesses:
J. P. WOOD,
C. J. ROBERTS.